United States Patent
Yuta et al.

(10) Patent No.: US 7,140,070 B2
(45) Date of Patent: Nov. 28, 2006

(54) FASTENER FOR ATTACHING FLOOR CARPET AND WIRE HARNESS TO A ROCKER PANEL

(75) Inventors: Kiyoteru Yuta, Toyohasi (JP); Yoshimichi Matsudaira, Toyohashi (JP); Masashi Dendo, Gamagoori (JP); Motoya Kimura, Aichi-ken (JP); Shinji Hosoi, Komki (JP); Masanori Sato, Toyota (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/669,690

(22) Filed: Sep. 25, 2003

(65) Prior Publication Data

US 2004/0108421 A1 Jun. 10, 2004

(30) Foreign Application Priority Data

Sep. 30, 2002 (JP) .............................. 2002-285692

(51) Int. Cl.
*F16B 15/00* (2006.01)
*A47G 27/04* (2006.01)

(52) U.S. Cl. ............................. 16/4; 16/17; 248/74.1
(58) Field of Classification Search .................... 16/4, 16/17, 6, 8, DIG. 40; 24/289, 297, 24, 22, 24/16 R, 17 AP, 455, 285; 285/23, 252, 285/921, 242; 248/74.1, 74.3, 74.4, 68.1, 248/49, 62, 67.5, 499
See application file for complete search history.

(56) References Cited

U.S. PATENT DOCUMENTS

| | | | | |
|---|---|---|---|---|
| 4,386,752 A | * | 6/1983 | Pavlak et al. | 248/73 |
| 4,550,891 A | * | 11/1985 | Schaty | 248/68.1 |
| 4,762,296 A | * | 8/1988 | Kraus et al. | 248/74.2 |
| 4,840,345 A | * | 6/1989 | Neil et al. | 248/74.2 |
| 5,161,759 A | * | 11/1992 | Burns et al. | 248/71 |
| 5,257,768 A | * | 11/1993 | Juenemann et al. | 248/604 |
| 5,263,671 A | * | 11/1993 | Baum | 248/68.1 |
| 5,474,268 A | * | 12/1995 | Yu | 248/61 |
| 5,845,883 A | * | 12/1998 | Meyer | 248/73 |
| 5,906,342 A | * | 5/1999 | Kraus | 248/74.1 |
| 6,062,633 A | | 5/2000 | Serizawa | 296/199 |
| 6,315,250 B1 | * | 11/2001 | Meyer | 248/74.1 |
| 6,669,150 B1 | * | 12/2003 | Benoit et al. | 248/74.2 |
| 6,708,933 B1 | * | 3/2004 | Girodo | 248/74.2 |

FOREIGN PATENT DOCUMENTS

| | | |
|---|---|---|
| DE | 72 29 223 | 11/1972 |
| DE | 195 39 457 | 5/1996 |
| DE | 199 45 370 | 3/2001 |
| EP | 0 276 926 | 8/1988 |
| FR | 2 214 348 | 8/1974 |
| JP | 3264583 | 12/1995 |
| JP | 9-112513 | 5/1997 |

* cited by examiner

Primary Examiner—Robert J. Sandy
Assistant Examiner—Andre L. Jackson
(74) Attorney, Agent, or Firm—Miles & Stockbridge, P.C.

(57) ABSTRACT

A fastener attaches a wire harness and an end of a floor carpet to a rocker panel of a vehicle and provides support for a rocker molding independently of the rocker panel. The wire harness includes a pair of arcuate arms pivotally mounted on a base of the fastener and having free ends that connect to one another to form a cylindrical wire harness holder that surrounds a wire harness. One of the arcuate arms is latched to the base and assists in retaining an end of the carpet on the base. Spaced rocker molding engagement portions on the base and on the one arcuate arm receive and retain respective legs of the rocker molding.

16 Claims, 11 Drawing Sheets

FASTENER FOR ATTACHING FLOOR CARPET AND WIRE HARNESS TO A ROCKER PANEL

CROSS REFERENCE TO RELATED APPLICATION

This application claims the benefit of Japanese Patent Application No. 2002-285692 filed Sep. 30, 2002, incorporated herein by reference.

BACKGROUND OF THE INVENTION

This invention relates to a fastener for attaching a floor carpet and a wire harness to a rocker panel of a vehicle, and more particularly, a fastener that is capable of attaching a rocker molding to the rocker panel, as well as a floor carpet and a wire harness.

Japanese Patent No. 3264583 discloses a floor carpet and wire harness fastener comprising a base having engagement means engageable with a rocker panel and a carpet engagement protrusion, a wire harness holder adapted to hold a wire harness and connected to the base in such a manner that it can be swingably moved close to and away from the base, and holder engagement means for fastening the wire harness holder to the base while sandwiching an end portion of the floor carpet between the base and the wire harness holder. In use of this fastener, a wire harness is temporarily fixed onto a rocker panel after attachment to a clampable holder of a harness clamp, and then a floor carpet is placed on a vehicle floor. Then, engagement means of the harness clamp is engageably inserted into an engagement hole formed in the end portion of the floor carpet, and the end portion of the floor carpet is pressed and fixed by a so-called scuff plate (rocker molding) and the clampable holder holding the wire harness. Thus, even after the completion of an operation of attaching a wire harness to a rocker panel, the floor carpet can be placed below the wire harness.

Generally, a rocker molding or scuff plate is attached to a rocker panel in such a manner that it covers a wire harness and an end portion of a floor carpet to protect them and provide enhanced appearance. In order to fix the rocker molding, the rocker panel is provided with a curved portion engageable with a support leg provided on the inner surface of the rocker molding, to hold the rocker molding. The aforementioned fastener includes an engagement portion engageable with another support leg provided on the inner surface of the rocker molding, to assist the fixing of the rocker molding.

BRIEF DESCRIPTION OF THE INVENTION

An object of the present invention is to provide an improved fastener for attaching a floor carpet and a wire harness to a rocker panel, and more particularly, a fastener that is capable of attaching a rocker molding to the rocker panel independently of the rocker panel.

In an embodiment of the invention, a fastener comprises a base attachable to a rocker panel and having a wire harness holder pivotally mounted on the base. The wire harness holder includes a pair of arcuate arms, free ends of which have cooperable latch parts for connecting the arms to one another around a wire harness. One of the arms and the base have cooperable latch parts for connecting the wire harness holder to the base. The fastener has a pair of spaced rocker molding engagement portions for receiving and retaining respective support legs of a rocker molding therein. A protrusion on the base is inserted in a hole in an end of a floor carpet, and the arm of the wire harness holder that is latched to the base assists in maintaining the end of the carpet on the protrusion.

BRIEF DESCRIPTION OF THE DRAWINGS

The invention will be further described in conjunction with the accompanying drawings, which illustrate a preferred (best mode) embodiment of the invention, and wherein:

FIGS. 9A and 9B are cross-sectional views of the shank of a clip in FIG. 1, wherein FIG. 9A is a sectional view taken along the line 9A—9A in FIG. 1, and FIG. 9B is a sectional view taken along the line 9B—9B in FIG. 1;

DETAILED DESCRIPTION OF THE INVENTION

Figure 14:
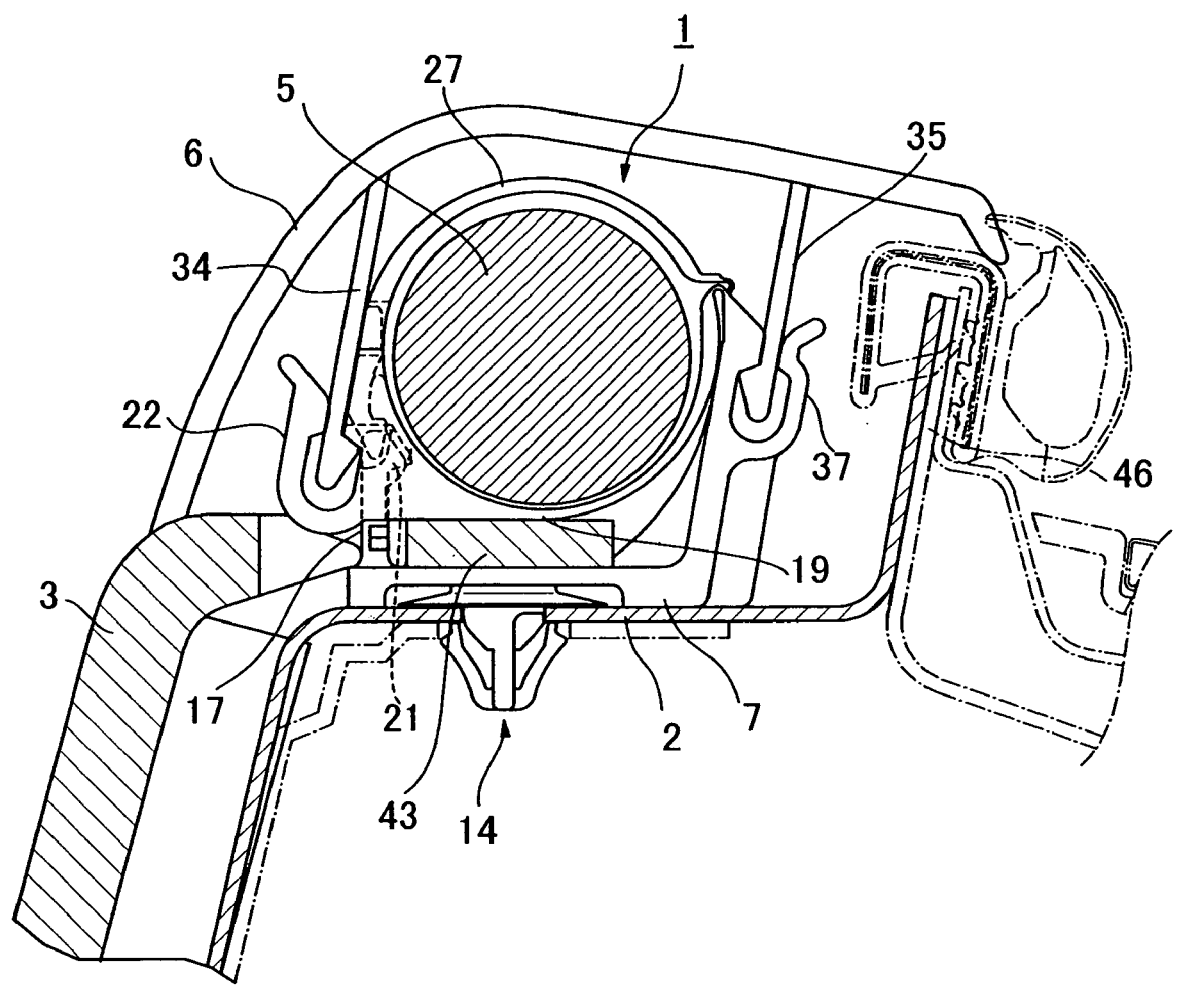
FIG. 14 is a partly sectional right side elevation view showing the state after a rocker molding is held by the fastener.

As shown in FIG. 14, a fastener 1 in an embodiment of the invention is used to attach a wire harness 5 and an end 43 of a floor carpet 3 to a rocker panel 2 of a vehicle and to support a rocker molding 6 independently of the rocker panel.

As shown in FIGS. 1–6, the fastener 1, which is preferably an integrally molded plastic component, has a base 7 with a base plate 9 from which a post 10 projects. In the form shown, the base plate 9 is a flat plate of constant width. The post 10 is braced by ribs 11 and 13 to provide additional strength. The height of the post takes into consideration the diameter of the wire harness 5.

Figure 9A:
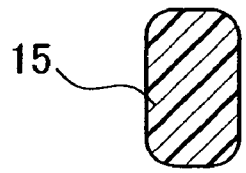
Figure 9B:
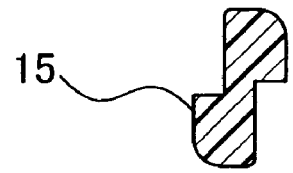
Figure 10:
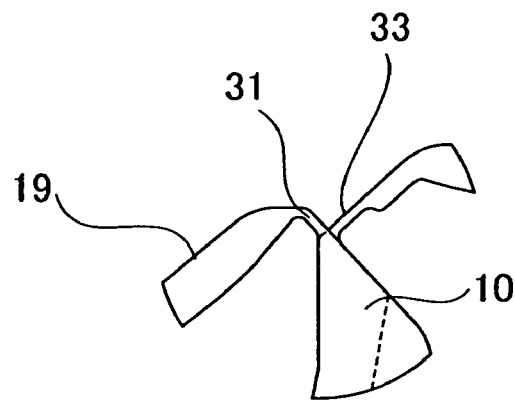
FIG. 10 is an enlarged view of a portion indicated by a circle X in FIG. 1.
Figure 11:
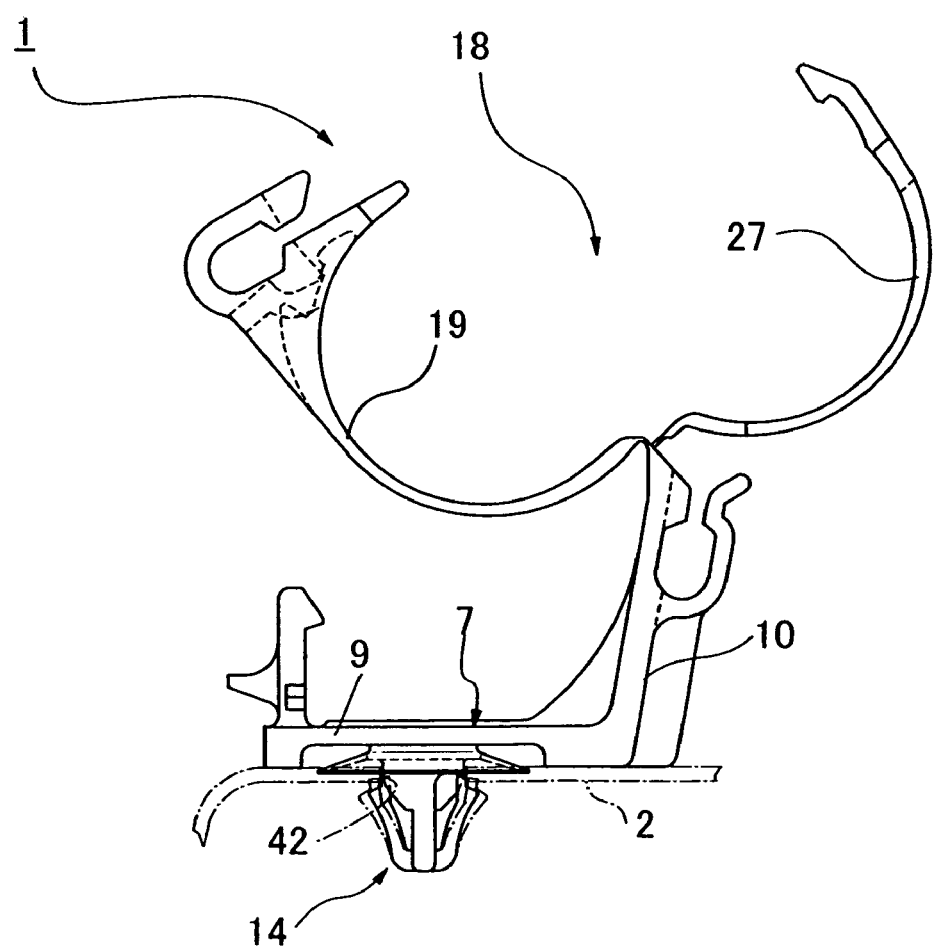
FIG. 11 is a right side elevation view showing the state after the fastener is attached to a rocker panel.

An anchor-type clip 14 projects from the base plate 9 in a direction opposite to the direction of the post 10, for insertion in a mounting hole 42 of the rocker panel, as shown in FIG. 11, for example. The clip 14 projects from the base plate 9. If the mounting hole of the rocker panel has a rectangular shape, the clip 14 can be designed to have a shank 15 with a rectangular section, as shown in FIGS. 9A and 9B, so as to prevent rotation of the clip 14 relative to the rocker panel. Other types of devices may be used, of course, to attach the fastener 1 to the rocker panel 2. For example, a stud clip may be used to attach the fastener to a stud fixed to the rocker panel.

Figure 12:
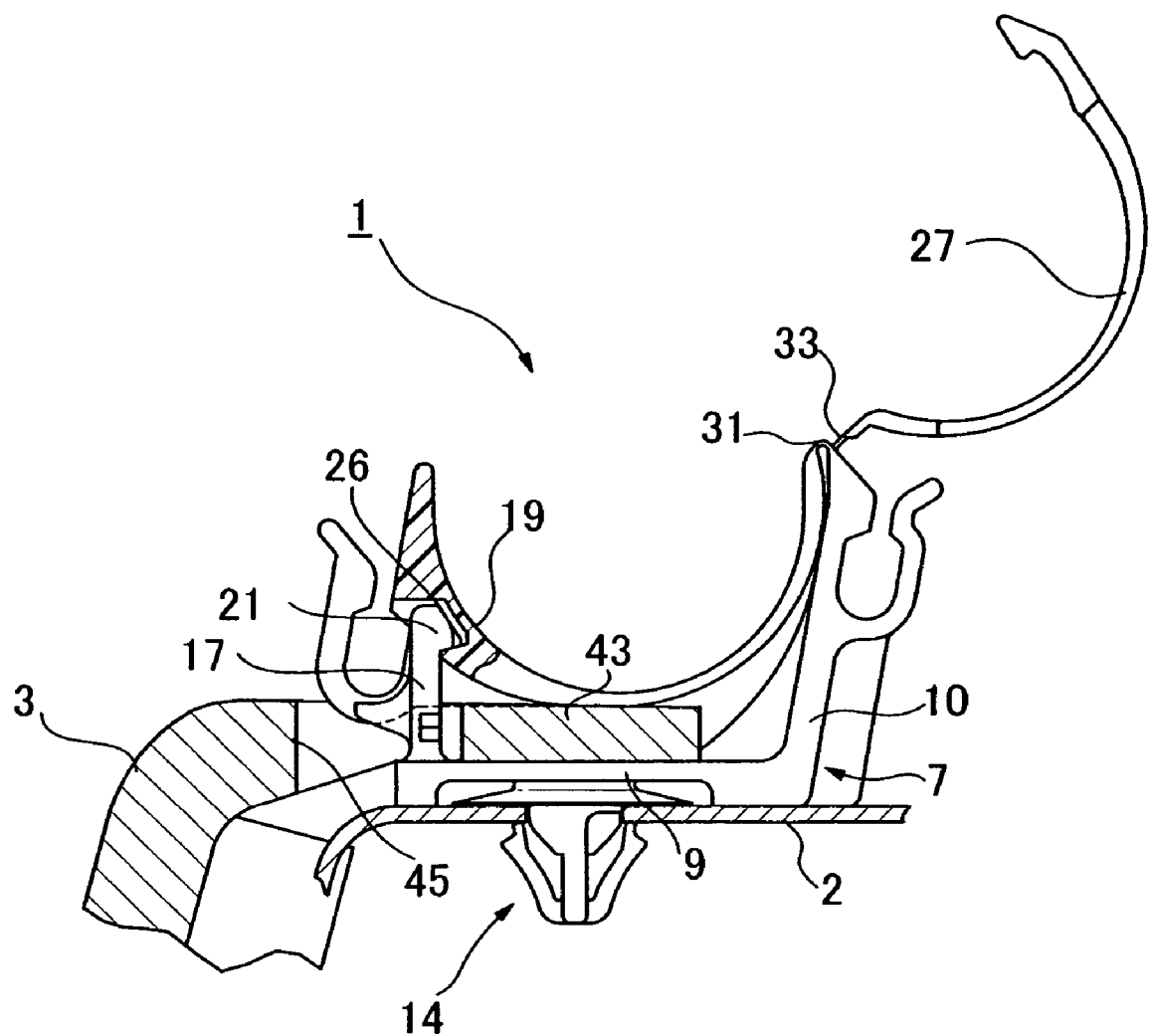
FIG. 12 is a partly sectional right side elevation view showing the state after a carpet is held by the fastener.

A carpet engagement protrusion 17 projects from the base plate 9 at an end of the base plate opposite to the post 10, for insertion in a mounting hole 45 formed in end portion 43 of the floor carpet 3, as shown in FIG. 12. Protrusion 17 cooperates with a wire harness holder 18.

Wire harness holder 18 includes first and second arcuate arms 19 and 27 pivotally mounted individually on post 10 by separate hinges 31 and 33 arranged end-to-end, as shown in FIGS. 2, 4, 5, and 10. The arcuate arms have cooperable latch parts 29 and 30 at their free ends for connecting the arms to one another.

Figure 13:
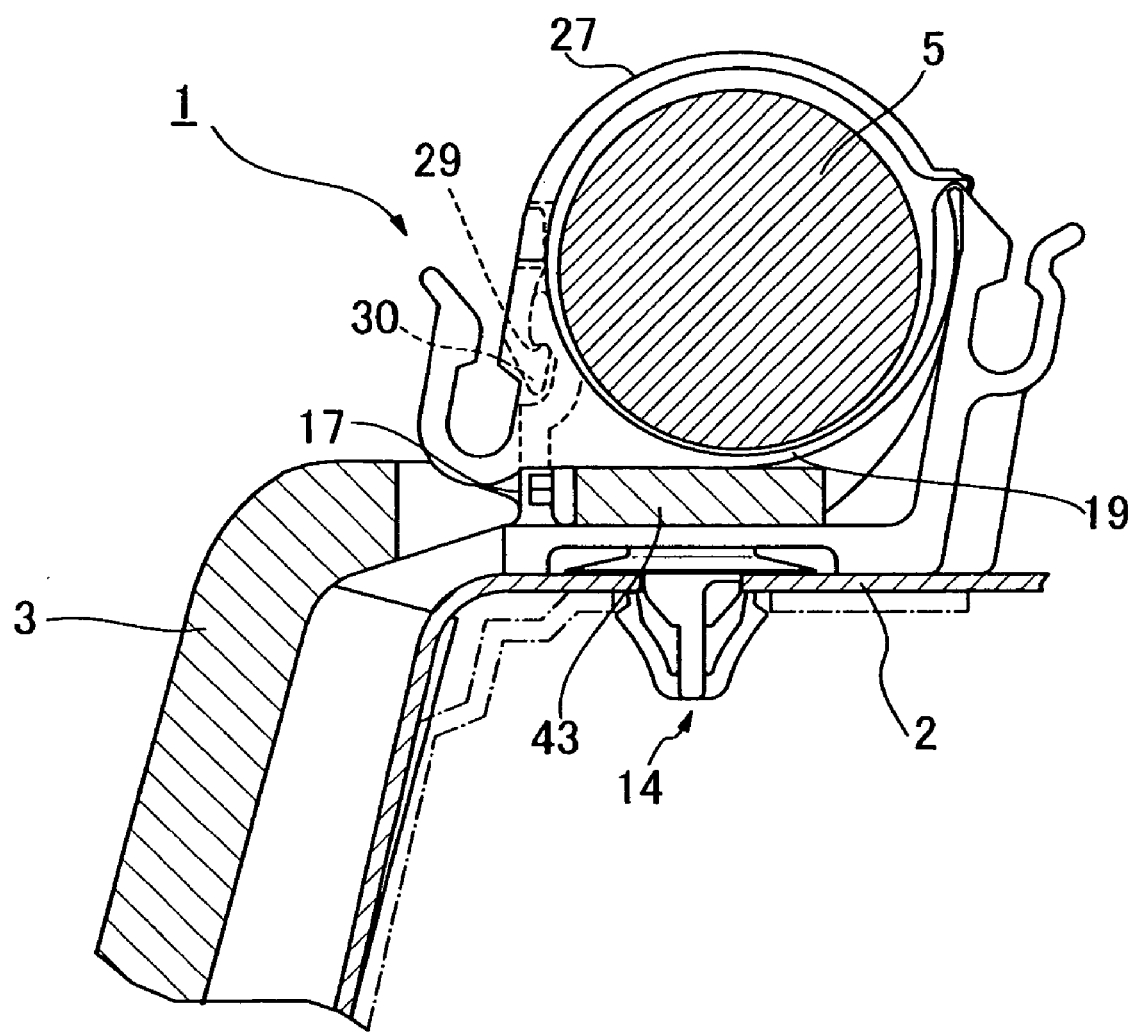
FIG. 13 is a partly sectional right side elevation view showing the state after a wire harness is held by the fastener.

Cooperable latch parts 21 and 26 (harness holder engagement means) are provided on the protrusion 17 and the arcuate arm 19 for connecting the arcuate arm 19 to the base, as shown in FIG. 12, so that when the arcuate arms 19 and 27 are connected to one another as shown in FIG. 13, the entire wire harness holder 18 can be connected to the base 7.

Figure 1:
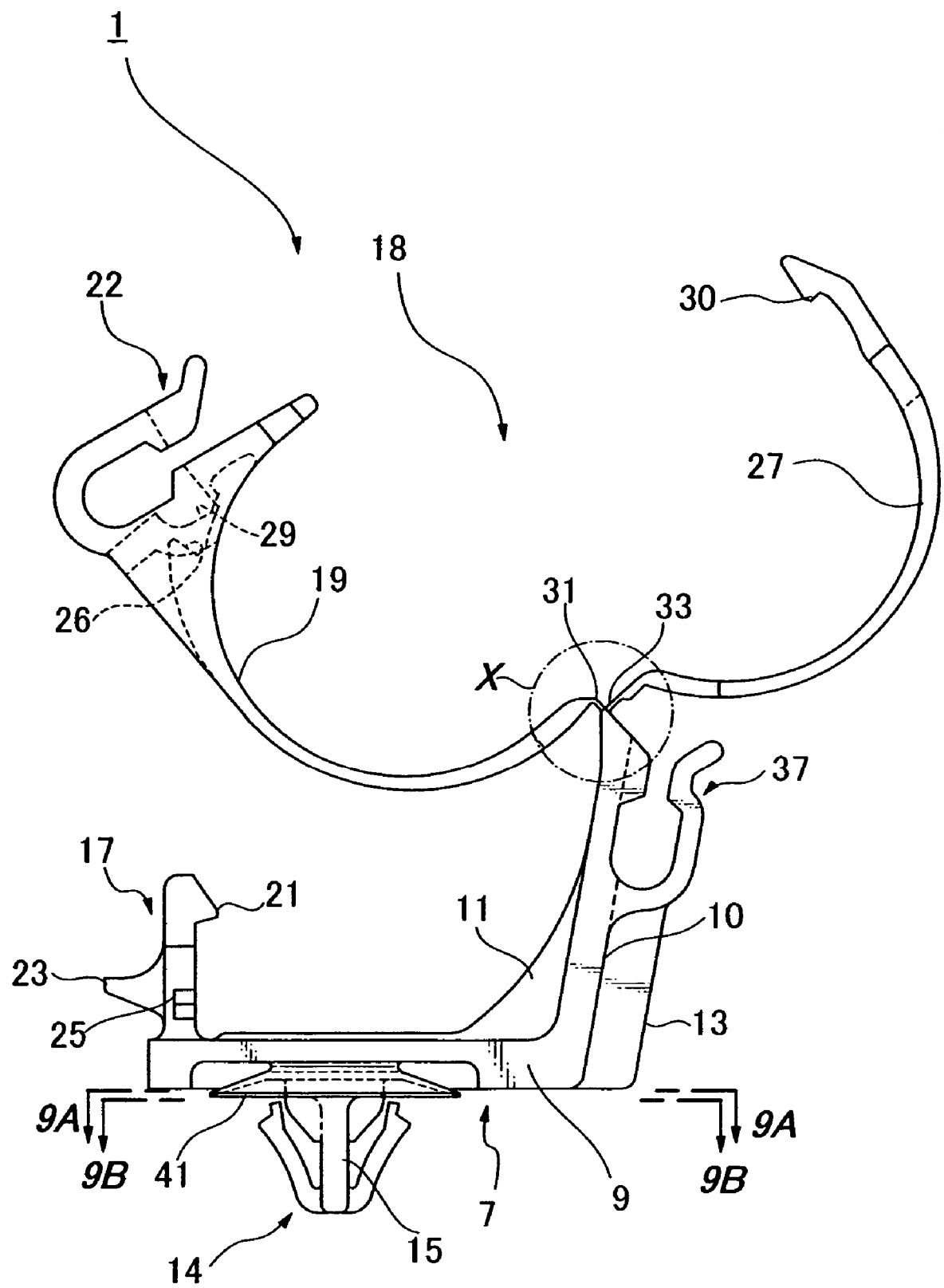
FIG. 1 is a right side elevation view of a fastener according to an embodiment of the present invention.
Figure 2:
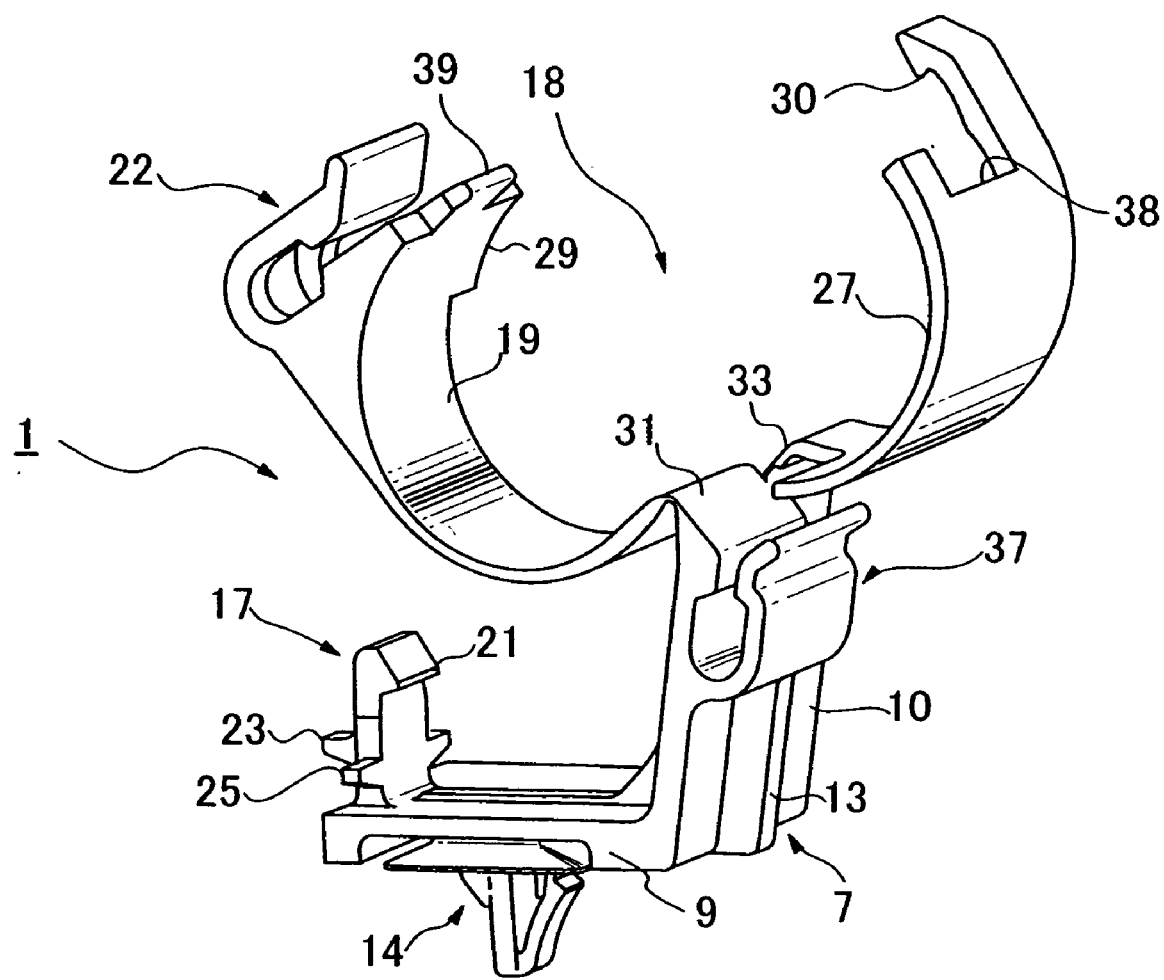
FIG. 2 is a right side perspective view of the fastener in FIG. 1.

A first U-shaped rocker molding engagement portion 22 is formed on the free end of arcuate arm 19, and a second U-shaped rocker molding engagement portion 37 projects from the post 10, as shown in FIGS. 1 and 2. The rocker molding engagement portions 22 and 37 have inlets facing away from the base 7 for receiving respective support legs 34 and 35 of the rocker molding 6, as shown in FIG. 14. The rocker molding engagement portions 22 and 37 and the ends of respective legs 34 and 35 have cooperable latch parts for attaching the rocker molding to the fastener 1. The rocker molding engagement portions 22 and 37 are spaced apart by an interval corresponding to the spacing of legs 34 and 35, and the wire harness 5 is disposed between the legs 34 and 35. As shown in FIG. 14, arcuate arm 19 of the wire harness holder engages end 43 of the carpet 3 for keeping the end of the carpet on the protrusion 17.

The second rocker molding engagement portion 37 is formed directly on the post 10 of the base 7 and has a high rigidity by virtue of the rib 13. Thus, the second rocker molding engagement portion 37 can immovably fix the received support leg 35 of the rocker molding 6. On the other hand, since the first rocker molding engagement portion 22 is formed on the free end of the arcuate arm 19, the arcuate arm 19 might be moved toward the base by inserting the support leg 34 of the rocker molding 6 in the first rocker molding engagement portion 22. Even with the cooperable latch parts 21 and 26 engaged with one another as shown in FIG. 12, an excessive insertion force from the support leg 34 could cause damage to the arcuate arm 19.

Figure 4:
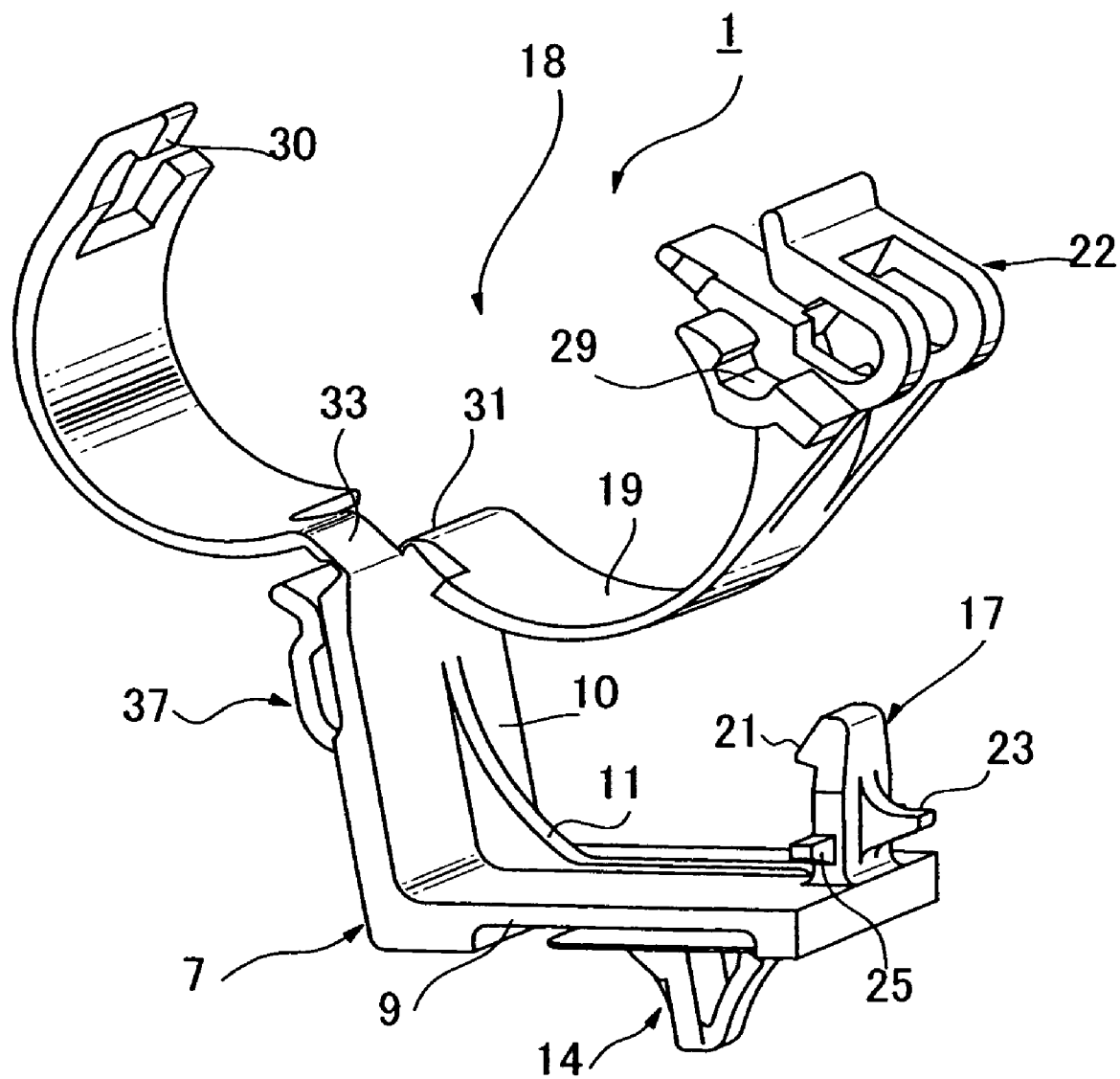
FIG. 4 is a left side perspective view of the fastener.
Figure 5:
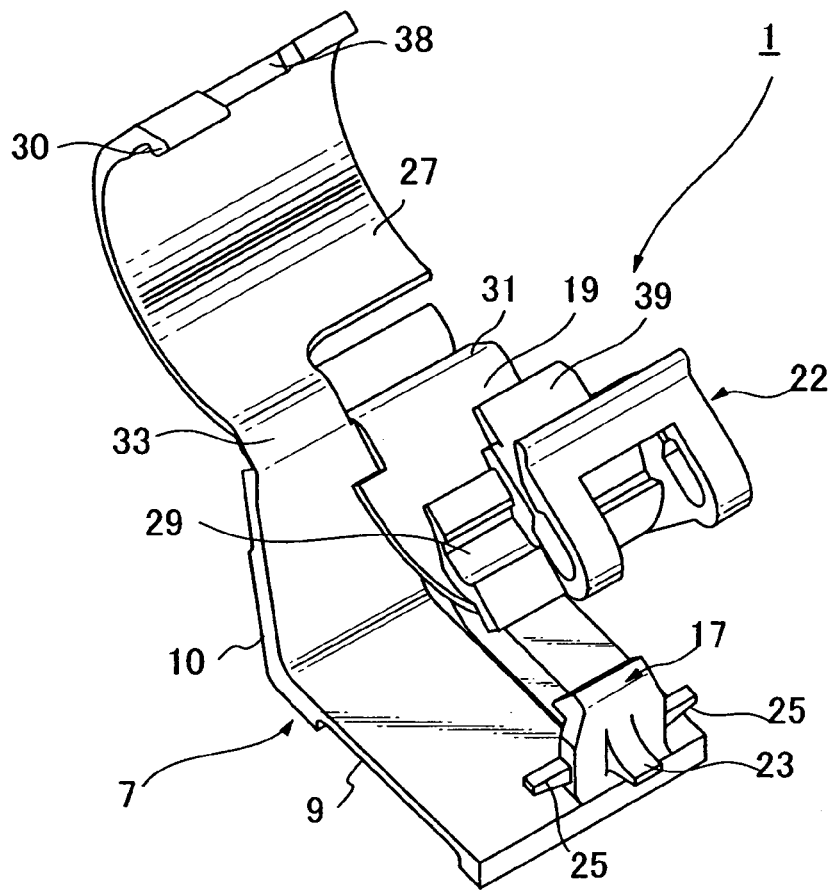
FIG. 5 is a left side perspective view of the fastener viewed from above.
Figure 6:
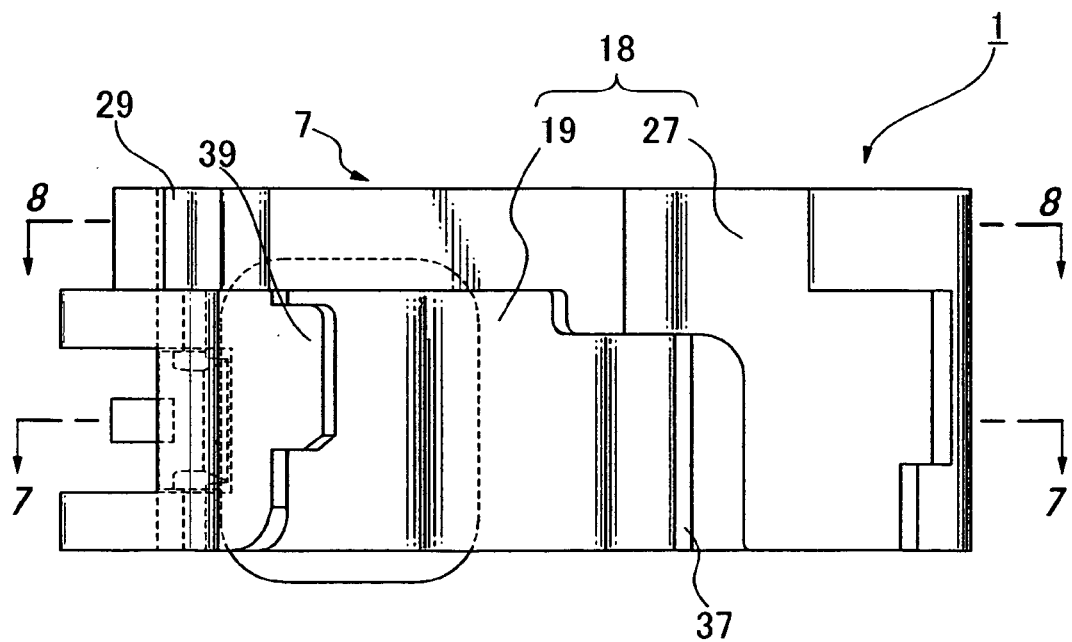
FIG. 6 is a top plan view of the fastener.
Figure 7:
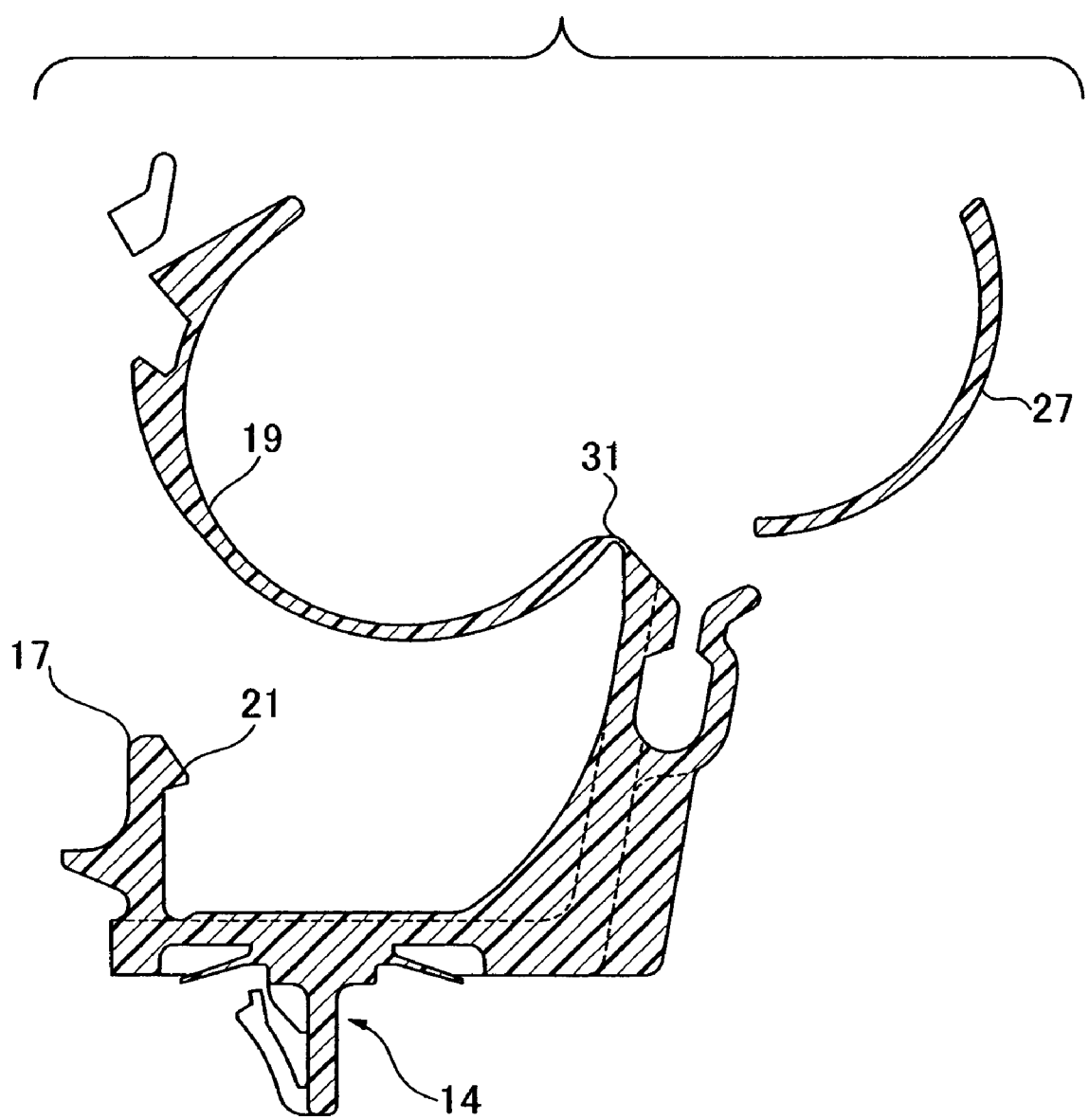
FIG. 7 is a sectional view of the fastener taken along the line 7—7 in FIG. 6.
Figure 8:
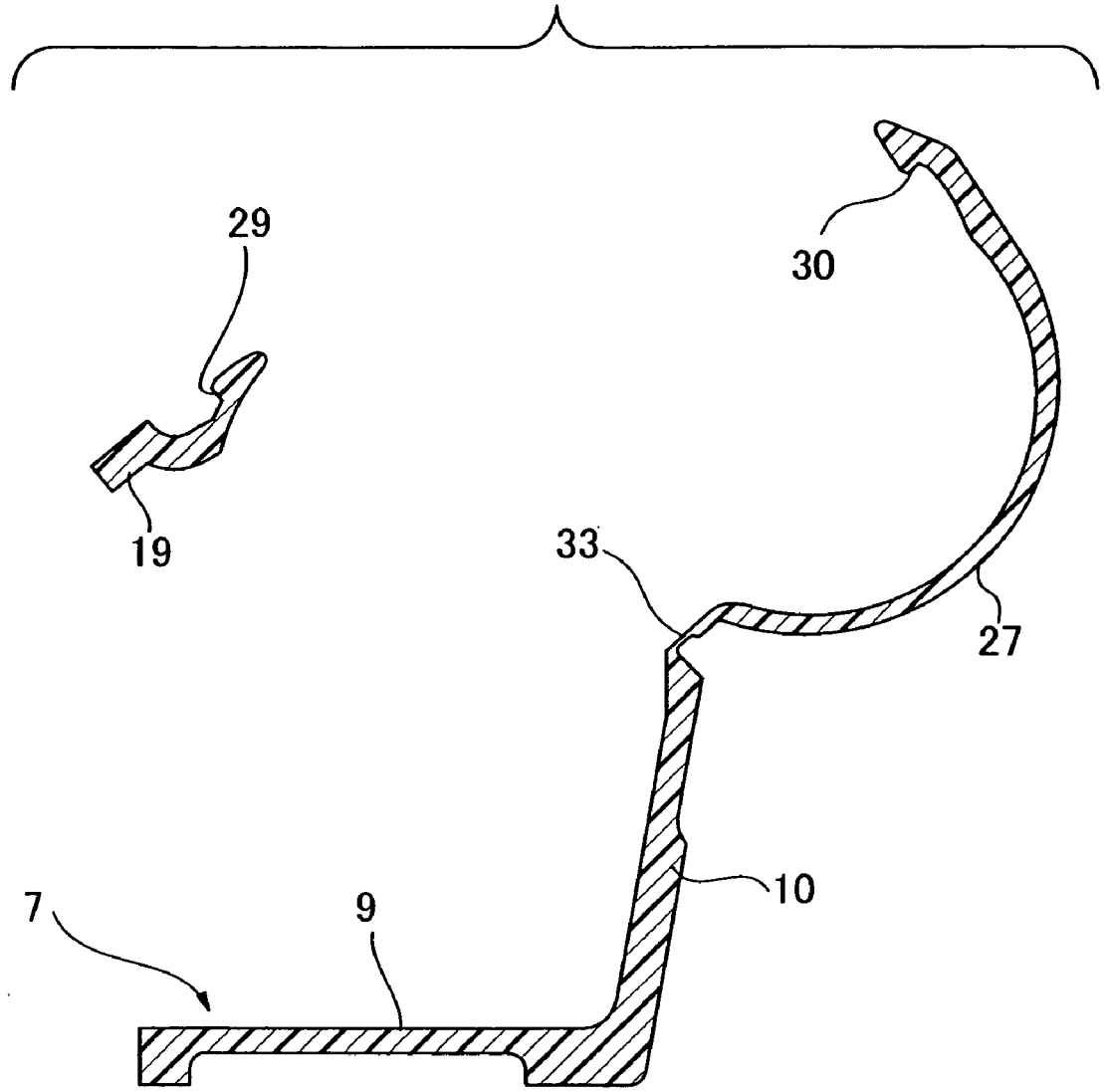
FIG. 8 is a sectional view of the fastener taken along the line 8—8 in FIG. 6.

In order to deal with this problem, the protrusion 17 has a first stop 23 extending in a direction away from the post 10 and second stops 25 symmetrically arranged on opposite sides of the protrusion 17. See FIGS. 1, 2, 4, and 5. As shown in FIGS. 4 and 5, the first rocker molding engagement portion 22 is bifurcated, and U-shaped bifurcations of the first rocker molding engagement portion 22 are spaced apart so that the protrusion 17 can be inserted between them for engagement of cooperable latch parts 21 and 26.

When the support legs 34 and 35 of the rocker molding 6 are inserted in the first and second rocker molding engagement portions 22 and 37, respectively, as shown in FIG. 14, support leg 34 can engage the first stop 23 to avoid excessive insertion of the first support leg 34. Stop 23 is adapted to directly determine the lower limit position of the end of the first support leg 34 of the rocker molding 6.

The U-shaped bifurcations of the rocker molding engagement portion 22 engage the respective second stops 25 to prevent the arcuate arm 19 from being excessively pressed toward the base. The first stop 23 and the second stops 25 can prevent damage to the arcuate arm 19 when the support leg 34 is pressed into the first rocker molding engagement portion 22.

It is apparent from their shape that the pair of cooperable latch parts on each of rocker molding engagement portions 22 and 37 and respective legs 34 and 35, like each other pair of cooperable latch parts referred to earlier, are shaped to facilitate engagement of the cooperable latch parts and to resist disengagement. One latch part or both latch parts of each pair is sufficiently resilient to permit the engagement.

As shown in FIGS. 2 and 5, a notch 38 is formed in a central region of the end of the arcuate arm 27, and a protrusion 39 to be received in the notch 38 is formed in the end of the arcuate arm 19. When the arcuate arm 27 is connected to the arcuate arm 19, the protrusion 39 is received in the notch 38. Thus, even if the wire harness is moved in a longitudinal direction thereof, the arcuate arm 27 is prevented from moving relative to the arcuate arm 19 in the longitudinal direction of the wire harness, and the connection between the arcuate arms is reliably maintained.

Figure 3:
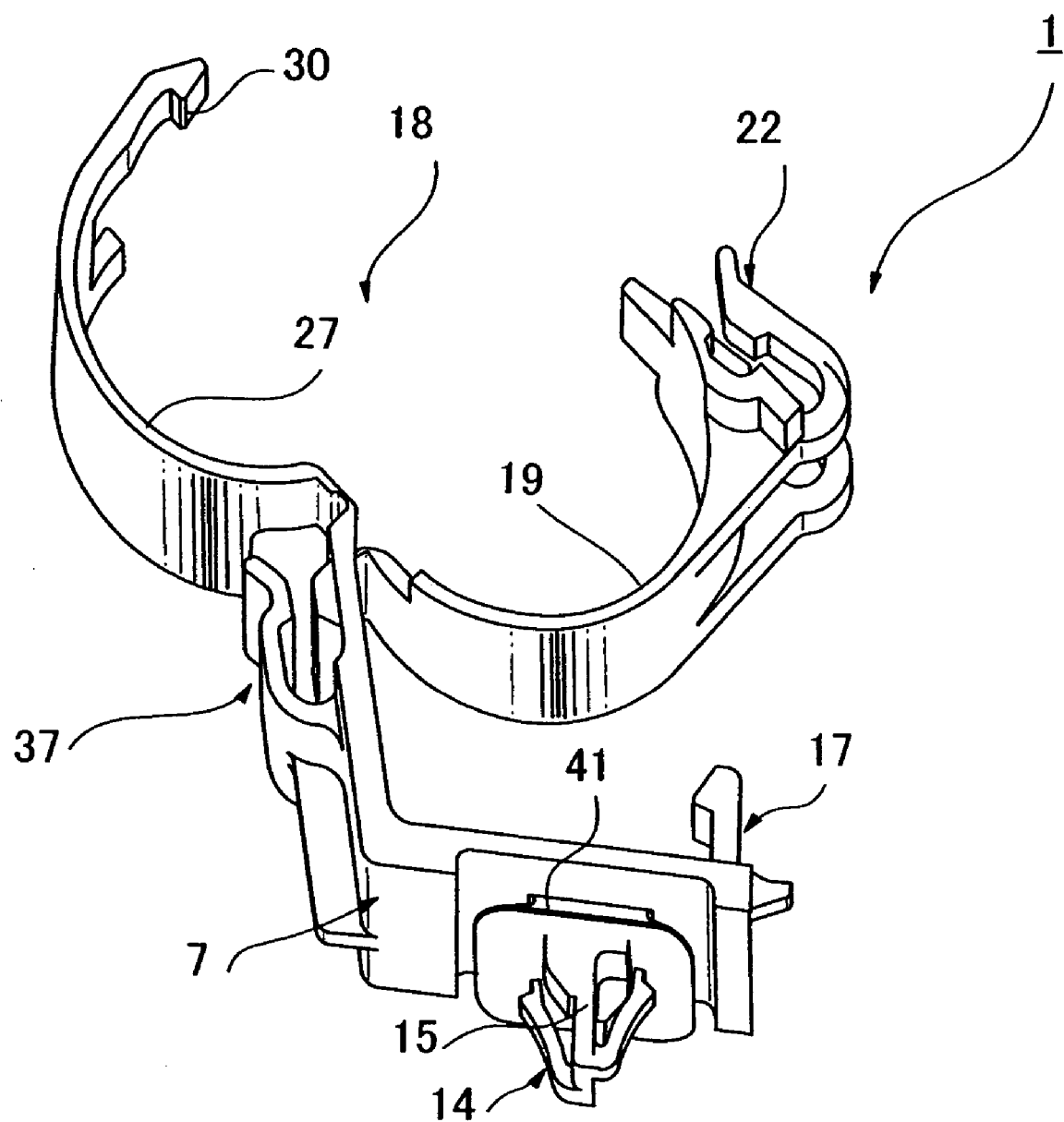
FIG. 3 is a left side perspective view of the fastener viewed from below.

As shown in FIGS. 1 and 3, the clip 14 has a suction-cup-shaped flange 41 to be brought into contact with the mounting hole section of the rocker panel. This flange can close the mounting hole to provide sound insulating and water sealing.

In use, the fastener 1 can be attached to the rocker panel 2 by insertion of the clip 14 in a mounting hole 42 (see FIG. 11). The arcuate arms 19 and 27 of the wire harness holder 18 are open, i.e., not connected to one another. As shown in FIG. 12, the floor carpet 3 is then placed on the base plate 9 of the base 7, inserting the protrusion 17 into the mounting hole 45 formed in the end portion 43 of the floor carpet. The arcuate arm 19 is then turned to connect the latch parts 21 and 26, whereby the end portion 43 of the floor carpet is pressed against the base plate 9, i.e., sandwiched between the base 7 and arcuate arm 19 of the wire harness holder 18.

As shown in FIG. 13, the wire harness 5 is then placed on the arcuate arm 19, and the arcuate arm 27 is turned to connect the latch parts 29 and 30 at the ends of the respective arms, so that a cylindrical structure surrounds and reliably holds the wire harness 5.

As shown in FIG. 14, the rocker molding 6 is then attached to the fastener 1, and through this attachment, is attached to the rocker panel 2. A worker presses on the rocker molding 6 to insert the support legs 34 and 35 in the respective rocker molding engagement portions 22 and 37. Thus the rocker molding 6 is mounted independently of a support portion 46 of the rocker panel 2. The rocker molding 6 can be detached from the fastener 1 by strongly pulling on the rocker molding to detach the support legs 34 and 35 from the respective rocker molding engagement portions 22 and 37, making it possible to replace the rocker molding or to repair or replace the wire harness 5 or the floor carpet 3.

In accordance with the invention, a fastener can be designed in conformity with the shape of the rocker molding to support the rocker molding irrespective of the shape of a rocker panel and can accommodate changes in the shape of the rocker panel or vehicle body and thus can be standardized. The fastener of the invention performs its functions in a compact structure. Operations of fixing the floor carpet and holding the wire harness can be readily performed without excessive physical labor. The fastener is constructed so as to avoid damage due to pressure from the rocker molding.

While a preferred embodiment of the invention has been shown and described, it will be apparent that changes can be made without departing from the principles and spirit of the invention, the scope of which is defined in the accompanying claims.

What is claimed is:

1. A fastener for fastening a floor carpet and a wire harness to a rocker panel and for supporting a rocker molding independently of the rocker panel, comprising:
   a base attachable to the rocker panel;
   a protrusion on the base for insertion in a hole in an end of a floor carpet; and
   a wire harness holder on the base,
   wherein the fastener has a pair of rocker molding, engagement means, having inlets facing away from the base, and being spaced from one another for receiving and retaining respective support legs of a rocker molding,
   wherein one of the rocker molding engagement means is a part of the base and the other rocker molding engagement means is a part of the wire harness holder,
   wherein the wire harness holder includes a pair of arcuate arms each having one end pivotally mounted on the base, the arms having respective free ends constructed for connection to one another to form a cylindrical structure surrounding a wire harness, and
   wherein the free end of one of the arcuate arms and the base have cooperable latch parts for connecting the free end of said one arcuate arm to the base, with a portion of said one arm spaced from the base when the free ends of the arcuate arms are connected.

2. A fastener according to claim 1, wherein the portion of said one arcuate arm is constructed to engage the end of the carpet in said space for holding the end of the carpet on the protrusion.

3. A fastener according to claim 1, wherein the latch part on the base is on the protrusion.

4. A fastener according to claim 1, wherein the arcuate arms are pivotally mounted on the base individually by separate hinges and the arcuate arms are connected to one another by cooperable latch parts at the free ends of the arcuate arms.

5. A fastener according to claim 4, wherein the protrusion is at one end of the base and the base has a post at its opposite end on which the arcuate arms are pivotally mounted.

6. A fastener for a floor carpet and a wire harness, comprising:
   a base having a carpet engagement protrusion;
   a wire harness holder adapted to hold a wire harness and pivotally supported on the base for movement between a first position away from the base and a second position adjacent to the base, at which a space is formed between a portion of the wire harness holder and the base; and
   holder engagement means for connecting the wire harness holder to the base when the wire harness holder is in the second position and for sandwiching an end portion of a floor carpet, in said space, between the base and the portion of the wire harness holder,
   wherein the fastener further comprises first and second rocker molding engagement means having inlets facing away from the base for receiving and retaining respective support legs therein formed on an inner surface of a rocker molding, when the wire harness holder is in the second position, and
   wherein the first rocker molding engagement means is located adjacent to the holder engagement means, and the second rocker molding engagement means is located adjacent to the pivotal support of the wire harness holder to the base.

7. The fastener as defined in claim 6, wherein the wire harness holder includes first and second arcuate arms pivotally supported on the base at one end of the arms and having free ends constructed for connection to one another to form a cylindrical structure for surrounding and holding the wire harness.

8. The fastener as defined in claim 7, wherein the holder engagement means comprises cooperable parts on one of the arcuate arms and on the carpet engagement protrusion.

9. The fastener as defined in claim 8, wherein the arcuate arms are individually pivotally supported on the base by separate hinges.

10. The fastener as defined in claim 9, wherein the first rocker molding engagement means is provided on the first arcuate arm adjacent to its free end and is U-shaped, and wherein the carpet engagement protrusion has a stop for limiting the insertion of the first support leg in the first rocker molding engagement means.

11. The fastener as defined in claim 10, wherein the carpet engagement protrusion has another stop for limiting the movement of the first rocker molding engagement means toward the base.

12. A fastener for fastening a floor carpet and a wire harness to a rocker panel and for supporting a rocker molding independently of the rocker panel, comprising:
   a base constructed for attachment to the rocker panel at one side of the base;
   a protrusion on an opposite side of the base constructed for insertion in a hole in an end of a floor carpet; and
   a wire harness holder on the base,
   wherein the fastener has a pair of rocker molding engagement means, having inlets facing away from the base, and being spaced from one another and constructed for receiving and retaining respective support legs of a rocker molding, wherein the wire harness holder includes a pair of arcuate arms each having one end pivotally mounted on the base, the arms having respective free ends constructed for connection to one another to form a cylindrical structure surrounding a wire harness.

13. A fastener according to claim 12, wherein one of the rocker molding engagement means is a part of the base and the other rocker molding engagement means is a part of one arm of the wire harness holder separate from the base.

14. A fastener for fastening a floor carpet and a wire harness to a rocker panel and for supporting a rocker molding independently of the rocker panel, comprising:
   a base constructed for attachment to the rocker panel at one side of the base;
   a protrusion on an opposite side of the base constructed for insertion in a hole in an end of a floor carpet; and
   a wire harness holder on the base,
   wherein the fastener has a pair of rocker molding engagement means, having inlets facing away from the base, and being spaced from one another and constructed for receiving and retaining respective support legs of a rocker molding.

15. A fastener according to claim 14, wherein the rocker molding engagement means are U-shaped.

16. A fastener according to claim 15, wherein the rocker molding engagement means and the respective support legs of the rocker molding have cooperable latch parts.

* * * * *